US010262206B2

(12) United States Patent
Posselius

(10) Patent No.: US 10,262,206 B2
(45) Date of Patent: Apr. 16, 2019

(54) VISION-BASED SYSTEM FOR ACQUIRING CROP RESIDUE DATA AND RELATED CALIBRATION METHODS

(71) Applicant: CNH Industrial America, LLC, New Holland, PA (US)

(72) Inventor: John Posselius, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 143 days.

(21) Appl. No.: 15/596,145

(22) Filed: May 16, 2017

(65) Prior Publication Data

US 2018/0336410 A1    Nov. 22, 2018

(51) Int. Cl.
*G06K 9/00* (2006.01)
*A01B 49/02* (2006.01)
(Continued)

(52) U.S. Cl.
CPC ........ *G06K 9/00657* (2013.01); *A01B 49/027* (2013.01); *A01B 63/32* (2013.01);
(Continued)

(58) Field of Classification Search
None
See application file for complete search history.

(56) References Cited

U.S. PATENT DOCUMENTS 4,935,700 A    6/1990  Garbini et al.
5,044,756 A    9/1991  Gaultney et al.
(Continued)

FOREIGN PATENT DOCUMENTS

CN           1447116      10/2003
WO    WO 2009/153304    12/2009
(Continued)

OTHER PUBLICATIONS

Beeson, Peter C., et al. "Multispectral satellite mapping of crop residue cover and tillage intensity in Iowa." Journal of Soil and Water Conservation 71.5 (2016): 385-395. (Year: 2016).*
(Continued)

*Primary Examiner* — Bhavesh M Mehta
*Assistant Examiner* — Tracy Mangialaschi
(74) *Attorney, Agent, or Firm* — Rebecca L. Henkel; Rickard K. DeMille

(57) ABSTRACT

A method for calibrating crop residue data for a field acquired using a vision-based system may include receiving image data associated with an imaged portion of the field, analyzing the image data using a first residue-estimating technique to determine a first estimated value of a crop residue parameter for the imaged portion of the field, and analyzing the image data using a second residue-estimating technique to determine a second estimated value of the crop residue parameter for the imaged portion of the field. In addition, when a differential exists between the first and second estimated values, the method may also include adjusting at least one of the first estimated value or one or more additional estimated values of the crop residue parameter determined using the first residue-estimating technique based on at least one of the second estimated value or the differential between first and second estimated values.

19 Claims, 6 Drawing Sheets

(51) Int. Cl.
  *A01B 63/32* (2006.01)
  *A01B 76/00* (2006.01)
  *A01B 79/00* (2006.01)

(52) U.S. Cl.
  CPC ............ *A01B 76/00* (2013.01); *A01B 79/005* (2013.01); *G06K 2209/17* (2013.01)

(56) References Cited

U.S. PATENT DOCUMENTS

| | | | |
|---|---|---|---|
| 5,278,423 | A | 1/1994 | Wangler et al. |
| 5,412,219 | A * | 5/1995 | Chappelle ............... G01N 21/64 250/253 |
| 6,222,628 | B1 | 4/2001 | Corallo et al. |
| 6,608,672 | B1 | 8/2003 | Shibusawa et al. |
| 6,853,937 | B2 | 2/2005 | Shibusawa et al. |
| 6,919,959 | B2 | 7/2005 | Masten |
| 7,092,106 | B2 | 8/2006 | Cox et al. |
| 7,748,264 | B2 | 7/2010 | Prem |
| 8,451,449 | B2 | 5/2013 | Holland |
| 8,755,049 | B2 | 6/2014 | Holland |
| 8,862,339 | B2 | 10/2014 | Henry et al. |
| 9,026,321 | B2 | 5/2015 | Henry et al. |
| 9,050,725 | B2 | 6/2015 | Shull |
| 9,148,995 | B2 | 10/2015 | Hrnicek et al. |
| 9,282,688 | B2 | 3/2016 | Casper et al. |
| 9,428,885 | B2 | 8/2016 | Nau |
| 2007/0039745 | A1 | 2/2007 | Anderson et al. |
| 2014/0347448 | A1 | 11/2014 | Hegemann et al. |
| 2015/0268218 | A1 | 9/2015 | Troxler |
| 2015/0305228 | A1 | 10/2015 | Zemenchik |
| 2015/0354943 | A1 | 12/2015 | Posselius et al. |
| 2016/0029547 | A1 | 2/2016 | Casper et al. |
| 2016/0134844 | A1 | 5/2016 | Casper et al. |
| 2017/0112043 | A1 * | 4/2017 | Nair ..................... A01B 63/002 |

FOREIGN PATENT DOCUMENTS

| | | |
|---|---|---|
| WO | WO 2012/029026 | 3/2012 |
| WO | WO 2016/110832 | 7/2016 |
| WO | WO 2017/049186 | 3/2017 |

OTHER PUBLICATIONS

Laamrani A, Joosse P, Feisthauer N. Determining the number of measurements required to estimate crop residue cover by different methods. Journal of Soil and Water Conservation. Sep. 1, 2017;72(5):471-9. (Year: 2017).*

Ted M. Zobek "Soil Surface Roughness Measurement" USDA, Agricultural Research Service, Lubbock, TX. Published 1990. (3 Pages).

Thuy Le Toan, F. Mattia, G. Satalino, T. Manninen and M. Borgeaud "On the Characterization of Agricultural Soil Roughness for Radar Remote Sensing Studies" Browaw Journals & Magazines Published Aug. 6, 2002. (3 Pages).

W. Skierucha, A.M. Wilczek and R.T. Walczak "Application of Smart Sensors in the Measurement of Soil Physical Parameters" Institute of Agrophysics, Polish Academy of Sciences, Lublin, Poland Published 2004. (6 Pages).

M.M. Rahman, M.S. Moran, D.P. Thoma, R. Bryant, C.D. Holifield Collins, T. Jackson, B.J. Orr and M. Tischler "Mapping Surface Roughness and Soil Moisture Using Multi-Angle Radar Imagery Without Ancillary Data" Science Direct / Remote Sensing of Environment Published 2008. (12 Pages).

L.M. Thomsen, J.E.M. Baartman, R.J. Barneveld, T. Starkloff and J. Stolte "Soil Surface Roughness: Comparing Old and New Measuring Methods and Application in a Soil Erosion Model" Land Management Group, Wageningen University, Wageningen, The Netherlands and Norwegian Institute of Agriculture and Environmental Research, Bioforsk, AS, Norway Published Apr. 24, 2015. (12 Pages).

Thuy Le Toan, F. Mattia, G. Satalino, T. Manninen and M. Borgeaud "On the Characterization of Agricultural Soil Roughness for Radars Remote Sensing Studies" Browaw Journals & Magazines Published Aug. 6, 2002. (3 Pages).

M.M. Rahman, M.S. Moran, D.P. Thoma, R. Bryant, C.D. Holifield Collins T. Jackson, B.J. Orr and M. Tischler "Mapping Surface Roughness and Soil Moisture Using Multi-Angle Radar Imagery Data" Science Direct / Remote Sensing of Environment Published 2008. (12 Pages).

* cited by examiner

VISION-BASED SYSTEM FOR ACQUIRING CROP RESIDUE DATA AND RELATED CALIBRATION METHODS

FIELD OF THE INVENTION

The present subject matter relates generally to a vision-based system for automatically acquiring crop residue data while an operation (e.g., a tillage operation) is being performed within a field and, more particularly, to related methods for calibrating a vision-based system used to acquire crop residue data.

BACKGROUND OF THE INVENTION

Crop residue generally refers to the vegetation (e.g., straw, chaff, husks, cobs) remaining on the soil surface following the performance of a given agricultural operation, such as a harvesting operation or a tillage operation. For various reasons, it is important to maintain a given amount of crop residue within a field following an agricultural operation. Specifically, crop residue remaining within the field can help in maintaining the content of organic matter within the soil and can also serve to protect the soil from wind and water erosion. However, in some cases, leaving an excessive amount of crop residue within a field can have a negative effect on the soil's productivity potential, such as by slowing down the warming of the soil at planting time and/or by slowing down seed germination. As such, the ability to monitor and/or adjust the amount of crop residue remaining within a field can be very important to maintaining a healthy, productive field, particularly when it comes to performing tillage operations.

In this regard, vision-based systems have been developed that attempt to estimate crop residue coverage from images captured of the field. However, such vision-based systems suffer from various drawbacks or disadvantages, particularly with reference to the accuracy of the crop residue estimates provided through the use of computer-aided image processing techniques.

Accordingly, an improved vision-based system for acquiring crop residue data and related methods for calibrating such a system to improve the accuracy of the crop residue estimates provided therewith would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for calibrating crop residue data for a field acquired using a vision-based system. The method may include controlling, with a computing device, an operation of at least one of an implement or a work vehicle as the implement is being towed by the work vehicle across the field and receiving, with the computing device, image data associated with an imaged portion of the field. In addition, the method may include analyzing, with the computing device, the image data using a first residue-estimating technique to determine a first estimated value of a crop residue parameter for the imaged portion of the field and analyzing, with the computing device, the image data using a second residue-estimating technique to determine a second estimated value of the crop residue parameter for the imaged portion of the field, wherein the second residue-estimating technique differs from the first residue-estimating technique. Moreover, when a differential exists between the first and second estimated values, the method may also include adjusting at least one of the first estimated value or one or more additional estimated values of the crop residue parameter determined using the first residue-estimating technique based on at least one of the second estimated value or the differential between first and second estimated values.

In another aspect, the present subject matter is directed to a vision-based system for estimating and adjusting crop residue parameters as an implement is being towed across a field by a work vehicle. The system may include an imaging device installed relative to one of the work vehicle or the implement such that the imaging device is configured to capture images of the field. The system may also include a controller communicatively coupled to the imaging device, with the controller including a processor and associated memory. The memory may store instructions that, when implemented by the processor, configure the controller to receive, from the imaging device, image data associated with an imaged portion of the field, analyze the image data using a first residue-estimating technique to determine a first estimated value of a crop residue parameter for the imaged portion of the field, and analyze the image data using a second residue-estimating technique to determine a second estimated value of the crop residue parameter for the imaged portion of the field, wherein the second residue-estimating technique differs from the first residue-estimating technique. Moreover, when a differential exists between the first and second estimated values, the controller may be configured to adjust at least one of the first estimated value or one or more additional estimated values of the crop residue parameter determined using the first residue-estimating technique based on at least one of the second estimated value or the differential between first and second estimated values.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
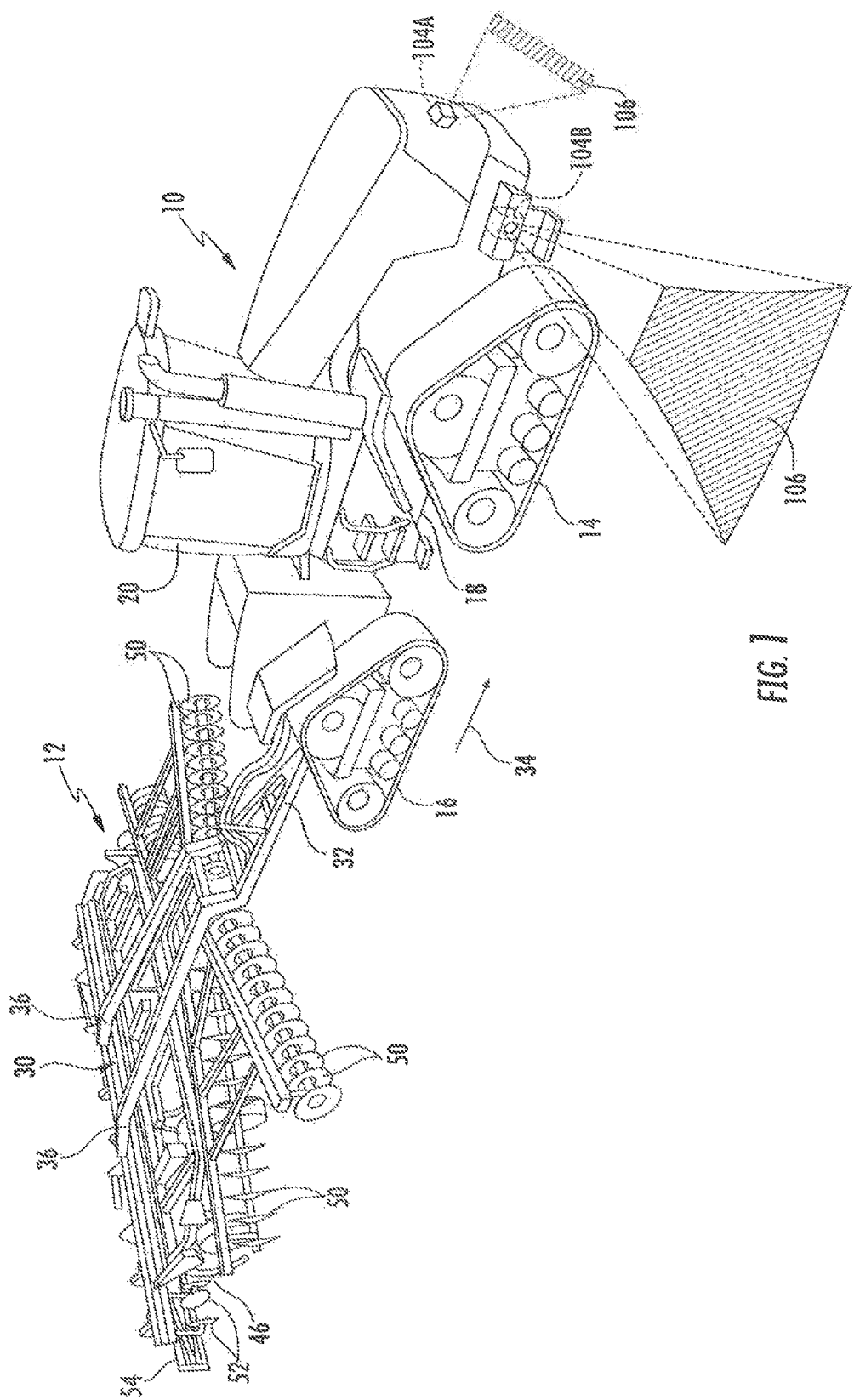
FIG. 1 illustrates a perspective view of one embodiment of a work vehicle towing an implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a vision-based system for acquiring crop residue data associated with a field. In addition, the present subject matter is directed to methods for calibrating crop residue acquired using a vision-based system. Specifically, in several embodiments, one or more imaging devices (e.g., a camera(s)) may be provided in operative association with a work vehicle and/or an associated implement to capture images of a field as an operation (e.g., a tillage operation) is being performed within the field. The images may then be automatically analyzed via an associated controller using two different computer vision-based techniques to estimate a crop residue parameter for the imaged portion of the field (e.g., the percent crop residue coverage). For instance, a first vision-based residue-estimating technique (e.g., a computer vision-based blob analysis or other data extraction techniques) may be used to determine a first estimated value for the crop residue parameter associated with the imaged portion of the field while a second vision-based residue-estimating technique (e.g., a computer vision-based linear transect method) may be used to determine a second estimated value for the crop residue parameter associated with same imaged portion of the field. The first and second estimated values determined using the differing residue-estimating techniques may then be compared to determine whether a differential exists between the estimated values. In the event that the separate residue-estimating techniques provide differing values for the crop residue parameter, the estimated value determined using one of the residue-estimating techniques may be calibrated or adjusted based on the estimated value determined using the other residue-estimating technique (or based on the differential between the two estimated values) to improve the accuracy of the crop residue data.

Figure 2:
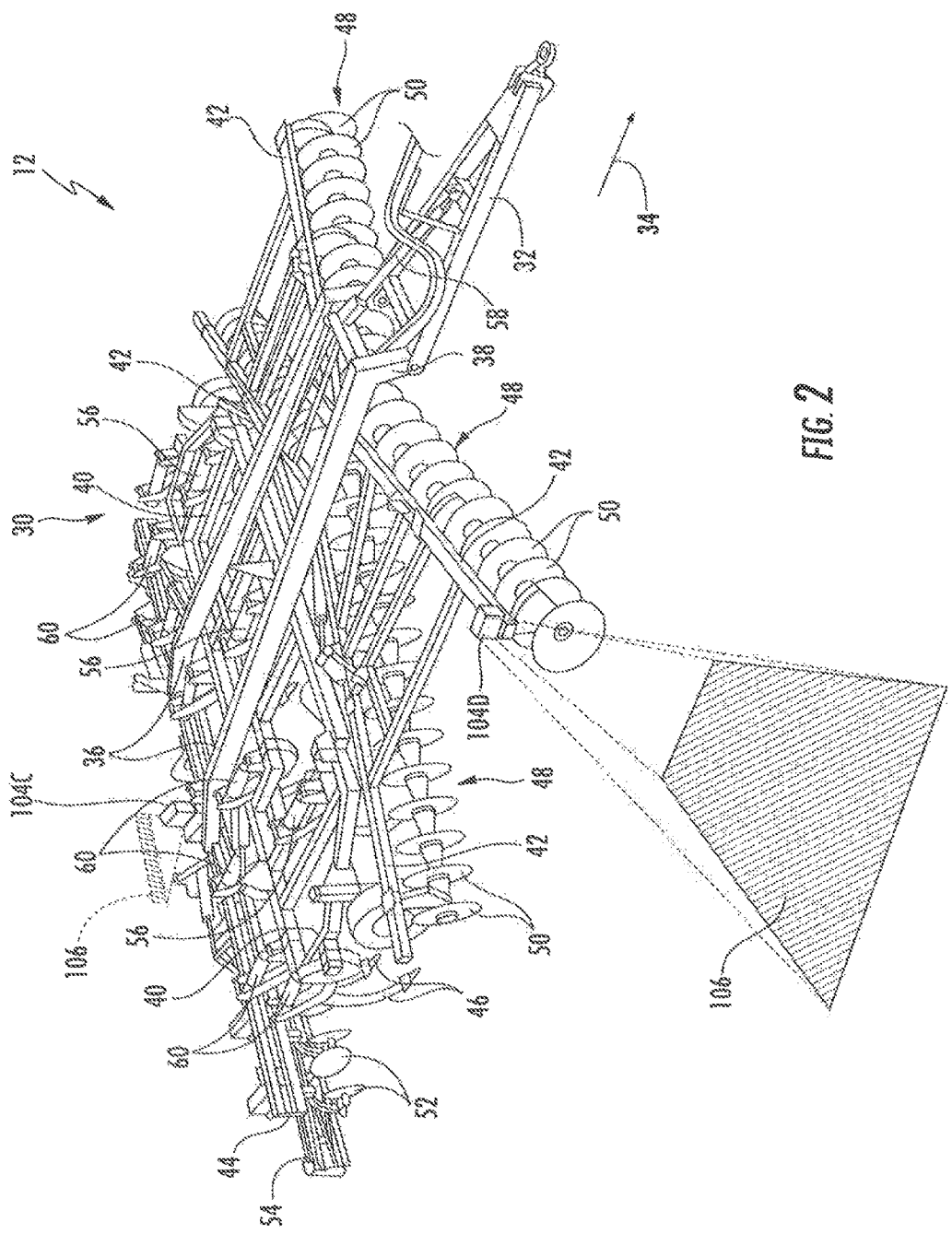
FIG. 2 illustrates a perspective view of the implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the implement 12 (e.g., across a field). Additionally, FIG. 2 illustrates a perspective view of the implement 12 shown in FIG. 1. As shown in the illustrated embodiment, the work vehicle 10 is configured as an agricultural tractor. However, in other embodiments, the work vehicle 10 may be configured as any other suitable agricultural vehicle.

As particularly shown in FIG. 1, the work vehicle 10 includes a pair of front track assemblies 14, a pair or rear track assemblies 16 and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, as is generally understood, the work vehicle 10 may include an engine 22 (FIG. 3) and a transmission 24 (FIG. 3) mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Moreover, as shown in FIGS. 1 and 2, the implement 12 may generally include a carriage frame assembly 30 configured to be towed by the work vehicle via a pull hitch or tow bar 32 in a travel direction of the vehicle (e.g., as indicated by arrow 34). As is generally understood, the carriage frame assembly 30 may be configured to support a plurality of ground-engaging tools, such as a plurality of shanks, disk blades, leveling blades, basket assemblies, and/or the like. In several embodiments, the various ground-engaging tools may be configured to perform a tillage operation across the field along which the implement 12 is being towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally function to support a central frame 40, a forward frame 42 positioned forward of the central frame 40 in the direction of travel 34 of the work vehicle 10, and an aft frame 44 positioned aft of the central frame 40 in the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

Moreover, similar to the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality closing disks.

In addition, the implement 12 may also include any number of suitable actuators (e.g., hydraulic cylinders) for adjusting the relative positioning, penetration depth, and/or down force associated with the various ground-engaging tools 46, 50, 52, 54. For instance, the implement 12 may include one or more first actuators 56 coupled to the central frame 40 for raising or lowering the central frame 40 relative to the ground, thereby allowing the penetration depth and/or the down pressure of the shanks 46 to be adjusted. Similarly, the implement 12 may include one or more second actuators 58 coupled to the disk forward frame 42 to adjust the penetration depth and/or the down pressure of the disk blades 50. Moreover, the implement 12 may include one or more third actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the down pressure and/or the penetration depth) to be adjusted.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tires/wheels in lieu of the track assemblies 14, 16.

It should also be appreciated that the configuration of the implement 12 described above and shown in FIGS. 1 and 2 is only provided for exemplary purposes. Thus, it should be appreciated that the present subject matter may be readily adaptable to any manner of implement configuration. For example, as indicated above, each frame section of the implement 12 may be configured to support any suitable type of ground-engaging tools, such as by installing closing disks on the aft frame 44 of the implement 12.

Additionally, in accordance with aspects of the present subject matter, the work vehicle 10 and/or the implement 12 may include one or more imaging devices coupled thereto and/or supported thereon for capturing images or other image data associated with the field as an operation is being performed via the implement 12. Specifically, in several embodiments, the imaging device(s) may be provided in operative association with the work vehicle 10 and/or the implement 12 such that the imaging device(s) has a field of view directed towards a portion(s) of the field disposed in front of, behind, and/or along one or both of the sides of the work vehicle 10 and/or the implement 12 as the implement 12 is being towed across the field. As such, the imaging device(s) may capture images from the tractor 10 and/or implement 12 of one or more portion(s) of the field being passed by the tractor 10 and/or implement 12.

In general, the imaging device(s) may correspond to any suitable device(s) configured to capture images or other image data of the field that allow the field's soil to be distinguished from the crop residue remaining on top of the soil. For instance, in several embodiments, the imaging device(s) may correspond to any suitable camera(s), such as single-spectrum camera or a multi-spectrum camera configured to capture images in the visible light range and/or infrared spectral range. Additionally, in a particular embodiment, the camera(s) may correspond to a single lens camera configured to capture two-dimensional images or a stereo camera(s) having two or more lenses with a separate image sensor for each lens to allow the camera(s) to capture stereographic or three-dimensional images. Alternatively, the imaging device(s) may correspond to any other suitable image capture device(s) and/or vision system(s) that is capable of capturing "images" or other image-like data that allow the crop residue existing on the soil to be distinguished from the soil.

It should be appreciated that work vehicle 10 and/or implement 12 may include any number of imaging device(s) 104 provided at any suitable location that allows images of the field to be captured as the vehicle 10 and implement 12 traverse through the field. For instance, FIGS. 1 and 2 illustrate examples of various locations for mounting one or more imaging device(s) for capturing images of the field. Specifically, as shown in FIG. 1, in one embodiment, one or more imaging devices 104A may be coupled to the front of the work vehicle 10 such that the imaging device(s) 104A has a field of view 106 that allows it to capture images of an adjacent area or portion of the field disposed in front of the work vehicle 10. For instance, the field of view 106 of the imaging device(s) 104A may be directed outwardly from the front of the work vehicle 10 along a plane or reference line that extends generally parallel to the travel direction 34 of the work vehicle 10. In addition to such imaging device(s) 104A (or as an alternative thereto), one or more imaging devices 104B may also be coupled to one of the sides of the work vehicle 10 such that the imaging device(s) 104B has a field of view 106 that allows it to capture images of an adjacent area or portion of the field disposed along such side of the work vehicle 10. For instance, the field of view 106 of the imaging device(s) 104B may be directed outwardly from the side of the work vehicle 10 along a plane or reference line that extends generally perpendicular to the travel direction 34 of the work vehicle 10.

Similarly, as shown in FIG. 2, in one embodiment, one or more imaging devices 104C may be coupled to the rear of the implement 12 such that the imaging device(s) 104C has a field of view 106 that allows it to capture images of an adjacent area or portion of the field disposed aft of the implement. For instance, the field of view 106 of the imaging device(s) 104C may be directed outwardly from the rear of the implement 12 along a plane or reference line that extends generally parallel to the travel direction 34 of the work vehicle 10. In addition to such imaging device(s) 104C (or as an alternative thereto), one or more imaging devices 104D may also be coupled to one of the sides of the implement 12 such that the imaging device(s) 104D has a field of view 106 that allows it to capture images of an adjacent area or portion of the field disposed along such side of the implement 12. For instance, the field of view 106 of the imaging device 104D may be directed outwardly from the side of the implement 12 along a plane or reference line that extends generally perpendicular to the travel direction 34 of the work vehicle 10.

It should be appreciated that, in alternative embodiments, the imaging device(s) 104 may be installed at any other suitable location that allows the device(s) to capture images of an adjacent portion of the field, such as by installing an imaging device(s) at or adjacent to the aft end of the work vehicle 10 and/or at or adjacent to the forward end of the implement 10. It should also be appreciated that, in several embodiments, the imaging devices 104 may be specifically installed at locations on the work vehicle 10 and/or the implement 12 to allow images to be captured of the field both before and after the performance of a field operation by the implement 12. For instance, by installing the imaging device 104A at the forward end of the work vehicle 10 and the imaging device 104C at the aft end of the implement 12, the forward imaging device 104A may capture images of the field prior to performance of the field operation while the aft imaging device 104C may capture images of the same portions of the field following the performance of the field operation.

Figure 3:
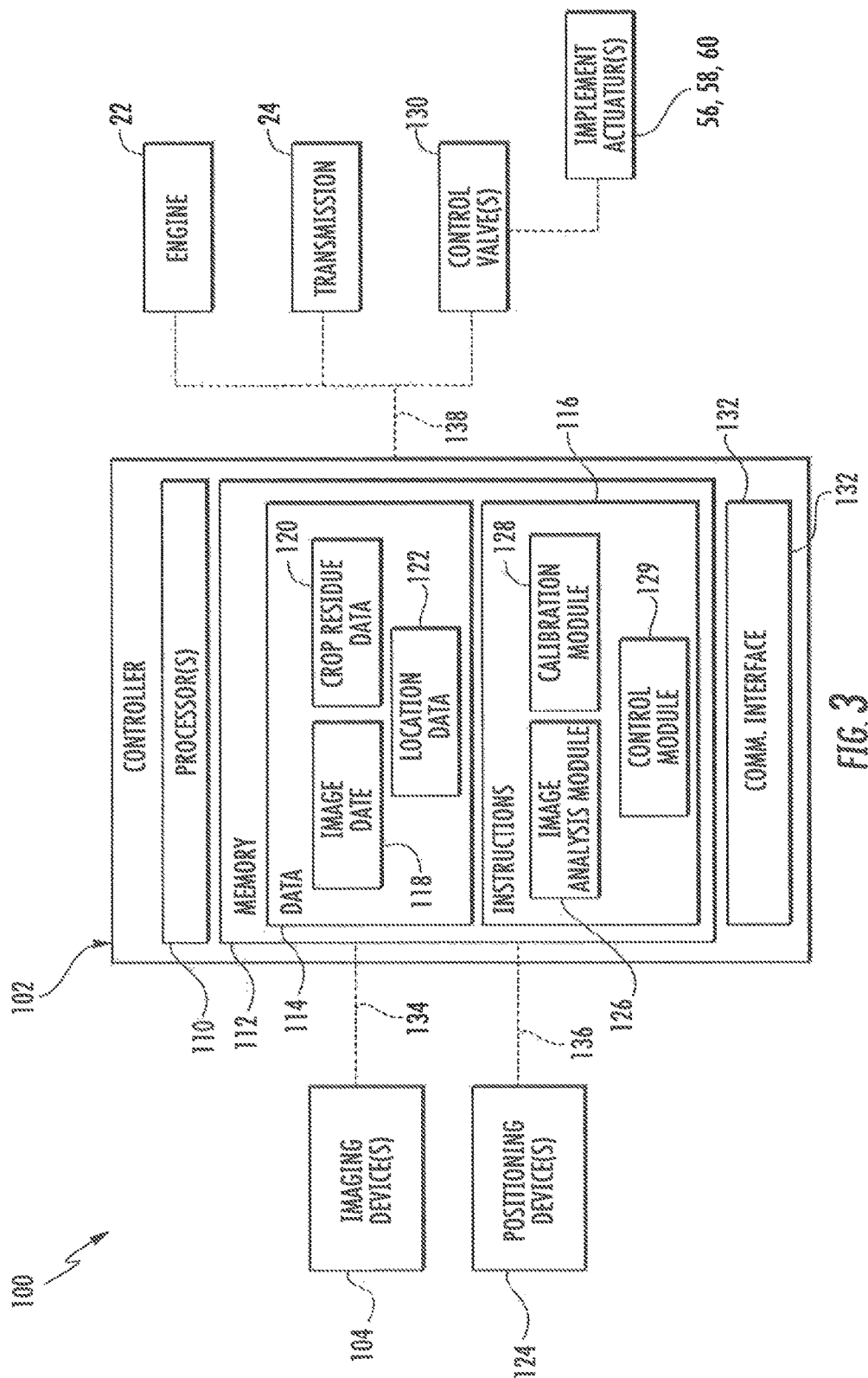
FIG. 3 illustrates a schematic view of one embodiment of a vision-based system for acquiring crop residue data in accordance with aspects of the present subject matter.

Referring now to FIG. 3, a schematic view of one embodiment of a vision-based system 100 for estimating crop residue parameters is illustrated in accordance with aspects of the present subject matter. In general, the system 100 will be described herein with reference to the work vehicle 10 and the implement 12 described above with reference to FIGS. 1 and 2. However, it should be appreciated that the disclosed system 100 may generally be utilized with work vehicles having any suitable vehicle configuration and/or implements have any suitable implement configuration.

In several embodiments, the system 100 may include a controller 102 and various other components configured to be communicatively coupled to and/or controlled by the controller 102, such as one or more imaging devices 104 and/or various components of the work vehicle 10 and/or the implement 12. As will be described in greater detail below, the controller 102 may be configured to receive images or other image data from the imaging device(s) 104 that depict portions of the field as an operation (e.g., a tillage operation) is being performed within the field. Based on an analysis of the image data received from the imaging device(s) 104, the controller 102 may be configured to estimate a first value for a crop residue parameter associated with the field (e.g., a percent crop residue coverage) using a first residue-estimating technique. Thereafter, the controller 102 may be configured to analyze the same or similar images or other image data to estimate a second value for the crop residue parameter using a second residue-estimating technique that differs from the first residue-estimating technique. Based on a comparison between the estimated values for the crop residue parameter determined using the two differing techniques, the controller may, if necessary or desired, calibrate the crop residue date being generated using one of the residue-estimating technique, such as by adjusting the first estimated value for the crop residue parameter determined using the first residue-estimating technique based on the second estimated value determined using the second residue-estimating technique.

In general, the controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include an image database 118 for storing image data received from the imaging device(s) 104. For example, the imaging device(s) 104 may be configured to continuously or periodically capture images of adjacent portion(s) of the field as an operation is being performed with the field. In such an embodiment, the images transmitted to the controller 102 from the imaging device(s) 104 may be stored within the image database 118 for subsequent processing and/or analysis. It should be appreciated that, as used herein, the term image data may include any suitable type of data received from the imaging device(s) 104 that allows for the crop residue coverage of a field to be analyzed, including photographs and other image-related data (e.g., scan data and/or the like).

Additionally, as shown in FIG. 3, the memory 12 may include a crop residue database 120 for storing information related to crop residue parameters for the field being processed. For example, as indicated above, based on the image data received from the imaging device(s) 104, the controller 102 may be configured to estimate or calculate one or more values for one or more crop residue parameters associated with the field, such as a value(s) for the percent crop residue coverage for an imaged portion(s) of the field (and/or a value(s) for the average percent crop residue coverage for the field). The crop residue parameter(s) estimated or calculated by the controller 102 may then be stored within the crop residue database 120 for subsequent processing and/or analysis.

Moreover, in several embodiments, the memory 12 may also include a location database 122 storing location information about the work vehicle/implement 10, 12 and/or information about the field being processed (e.g., a field map). Specifically, as shown in FIG. 3, the controller 102 may be communicatively coupled to a positioning device(s) 124 installed on or within the work vehicle 10 and/or on or within the implement 12. For example, in one embodiment, the positioning device(s) 124 may be configured to determine the exact location of the work vehicle 10 and/or the implement 12 using a satellite navigation position system (e.g. a GPS system, a Galileo positioning system, the Global Navigation satellite system (GLONASS), the BeiDou Satellite Navigation and Positioning system, and/or the like). In such an embodiment, the location determined by the positioning device(s) 124 may be transmitted to the controller 102 (e.g., in the form coordinates) and subsequently stored within the location database 122 for subsequent processing and/or analysis.

Additionally, in several embodiments, the location data stored within the location database 122 may also be correlated to the image data stored within the image database 118. For instance, in one embodiment, the location coordinates derived from the positioning device(s) 124 and the image(s) captured by the imaging device(s) 104 may both be time-stamped. In such an embodiment, the time-stamped data may allow each image captured by the imaging device(s) 104 to be matched or correlated to a corresponding set of location coordinates received from the positioning device(s) 124, thereby allowing the precise location of the portion of the field depicted within a given image to be known (or at least capable of calculation) by the controller 102.

Moreover, by matching each image to a corresponding set of location coordinates, the controller 102 may also be configured to generate or update a corresponding field map associated with the field being processed. For example, in instances in which the controller 102 already includes a field map stored within its memory 112 that includes location coordinates associated with various points across the field, each image captured by the imaging device(s) 104 may be mapped or correlated to a given location within the field map. Alternatively, based on the location data and the associated image data, the controller 102 may be configured to generate a field map for the field that includes the geo-located images associated therewith.

Referring still to FIG. 3, in several embodiments, the instructions 116 stored within the memory 112 of the controller 102 may be executed by the processor(s) 110 to implement an image analysis module 126. In general, the image analysis module 126 may be configured to analyze the images received by the imaging device(s) 104 using one or more residue-estimating techniques to allow the controller 102 to estimate one or more crop residue parameters associated with the field currently being processed. For instance, in several embodiments, the image analysis module 126 may be configured to implement two different residue-estimating techniques (e.g., first and second residue-estimating techniques), with each residue-estimating technique being based on a different computer-vision algorithm or any other suitable image-processing technique that allows the controller 102 to identify crop residue remaining on top of the soil. By identifying all or a portion of the crop residue contained within each image (or within a subset of the images) using the two different residue-estimating techniques, the controller 102 may then determine two values for the crop residue parameter(s) associated with a given imaged portion of the field. Such values may then be stored within the crop residue database 120.

It should be appreciated that, in general, the residue-estimating techniques used by the image analysis module 126 to estimate the crop residue parameter(s) may correspond to any suitable computer-vision algorithms or image-processing techniques that allow the controller 102 to identify crop residue remaining on top of the soil. For instance, as will be described below with reference to FIGS. 4 and 5, in one embodiment, the image analysis module may be configured to utilize both a computer vision-based blob analysis and a computer vision-based linear transect method to estimate values for the crop residue parameter(s). The estimated values determined using each of such residue-estimating techniques may then be stored within the crop residue database 120 for subsequent analysis and/or processing. However, in other embodiments, the image analysis module 126 may be configured to implement any other suitable vision-based residue-estimating techniques to estimate the crop residue parameter(s).

Moreover, as shown in FIG. 3, the instructions 116 stored within the memory 112 of the controller 102 may also be executed by the processor(s) 110 to implement a calibration module 128. In general, the calibration module 128 may be configured to calibrate the crop residue data generated by the image analysis module 126 based on the estimated values determined using the differing residue-estimating techniques. Specifically, in several embodiments, the calibration module 128 may be configured to compare the estimated value(s) of the crop residue parameter(s) determined using the first residue-estimating technique to the corresponding estimate value(s) of the crop residue parameter(s) determined using the second residue-estimating technique. In such embodiments, when a differential exists between the estimate value(s) determined using the first residue-estimating technique and the corresponding estimate value(s) determined using the second residue-estimating technique, the calibration module 128 may be configured to calibrate or adjust the estimated value(s) determined using one of the residue-estimating techniques based on the estimated value(s) determined using the other residue-estimating technique.

For instance, in one embodiment, the estimated value(s) determined using the second residue-estimating technique may be used to calibrate or adjust the estimate value(s) determined using the first residue-estimating technique. As an example, assuming that residue-estimating techniques are being used to determine estimated values of the percent crop residue coverage within the field, the image analysis module 126 may analyze one or more images of an imaged portion of the field and determine a first estimated value of 45% crop residue coverage using the first residue-estimating technique and a second estimated value of 50% crop residue coverage using the second residue-estimating technique. The calibration module 128 may then compare the first and estimated values and determine that a +5% differential exists between the estimated values. The calibration module 128 may then, in one embodiment, adjust the first estimated value and/or any future/past estimated values determined using the first residue-estimating technique based on the second estimated value and/or the differential determined between the first and second estimated values. For instance, the calibration module 128 may be configured to increase the first estimated value and/or any future/past estimated values determined using the first residue-estimating technique by 5% to ensure that the crop residue data generated using the first residue-estimating technique is consistent with the crop residue data generated using the second residue-estimating technique.

It should be appreciated that, in addition to analyzing the estimated values determined for a singled imaged portion of the field or as an alternative thereto, the calibration module 128 may be configured to analyze the estimated values determined for various different imaged portions of the field. In such an embodiment, the calibration module 128 may be configured to compare the estimated values determined using the first and second residue-estimating techniques for each imaged portion of the field to determine an average differential existing between the first and second estimated values. The calibration module 128 may then adjust the first estimated value and/or any future/past estimated values determined using the first residue-estimating technique based on the average differential determined across the various imaged portions of the field.

Additionally, it should be appreciated that, although the present subject matter is generally described herein as using the second estimated value(s) determined via the second residue-estimating technique to calibrate or adjust the first estimate value(s) determined via the first residue-estimating technique, the configuration may be reversed, with the first estimated value(s) being used to calibrate or adjust the second estimated value(s). In general, the residue-estimating technique used as the calibration source may be selected based on any number of factors, including accuracy considerations, computer processing requirements, standards or regulations set for crop residue data and/or the like.

Referring still to FIG. 3, the instructions 116 stored within the memory 112 of the controller 102 may also be executed by the processor(s) 110 to implement a control module 129. In general, the control module 129 may be configured to adjust the operation of the work vehicle 10 and/or the implement 12 by controlling one or more components of the implement/vehicle 12, 10. Specifically, in several embodiments, when the estimated crop residue parameter determined by the controller 102 differs from a given target set for such parameter, the control module 129 may be configured to fine-tune the operation of the work vehicle 10 and/or the implement 12 in a manner designed to adjust the amount of crop residue remaining in the field. For instance, when it is desired to have a percent crop residue coverage of 30%, the control module 129 may be configured to adjust the operation of the work vehicle and/or the implement 12 so as to increase or decrease the amount of crop residue remaining in the field when the estimated percent crop residue coverage for a given imaged portion of the field (or an average estimated percent crop residue coverage across multiple imaged portions of the field) differs from the target percentage.

It should be appreciated that the controller 102 may be configured to implement various different control actions to adjust the operation of the work vehicle 10 and/or the implement 12 in a manner that increases or decreases the amount of crop residue remaining in the field. In one embodiment, the controller 102 may be configured to increase or decrease the operational or ground speed of the implement 12 to affect an increase or decrease in the crop residue coverage. For instance, as shown in FIG. 3, the controller 102 may be communicatively coupled to both the engine 22 and the transmission 24 of the work vehicle 10. In such an embodiment, the controller 102 may be configured to adjust the operation of the engine 22 and/or the transmission 24 in a manner that increases or decreases the ground speed of the work vehicle 10 and, thus, the ground speed of the implement 12, such as by transmitting suitable control signals for controlling an engine or speed governor (not shown) associated with the engine 22 and/or transmitting suitable control signals for controlling the engagement/disengagement of one or more clutches (not shown) provided in operative association with the transmission 24.

In addition to the adjusting the ground speed of the vehicle/implement 10, 12 (or as an alternative thereto), the controller 102 may also be configured to adjust an operating parameter associated with the ground-engaging tools of the implement 12. For instance, as shown in FIG. 3, the controller 102 may be communicatively coupled to one or more valves 130 configured to regulate the supply of fluid (e.g., hydraulic fluid or air) to one or more corresponding actuators 56, 58, 60 of the implement 12. In such an embodiment, by regulating the supply of fluid to the actuator(s) 56, 58, 60, the controller 102 may automatically adjust the penetration depth, the down force, and/or any other suitable operating parameter associated with the ground-engaging tools of the implement 12.

Moreover, as shown in FIG. 3, the controller 102 may also include a communications interface 132 to provide a means for the controller 102 to communicate with any of the various other system components described herein. For instance, one or more communicative links or interfaces 134 (e.g., one or more data buses) may be provided between the communications interface 132 and the imaging device(s) 104 to allow images transmitted from the imaging device(s) 104 to be received by the controller 102. Similarly, one or more communicative links or interfaces 136 (e.g., one or more data buses) may be provided between the communications interface 132 and the positioning device(s) 124 to allow the location information generated by the positioning device(s) 124 to be received by the controller 102. Additionally, as shown in FIG. 3, one or more communicative links or interfaces 138 (e.g., one or more data buses) may be provided between the communications interface 132 and the engine 22, the transmission 24, the control valves 130, and/or the like to allow the controller 102 to control the operation of such system components.

Figure 4:
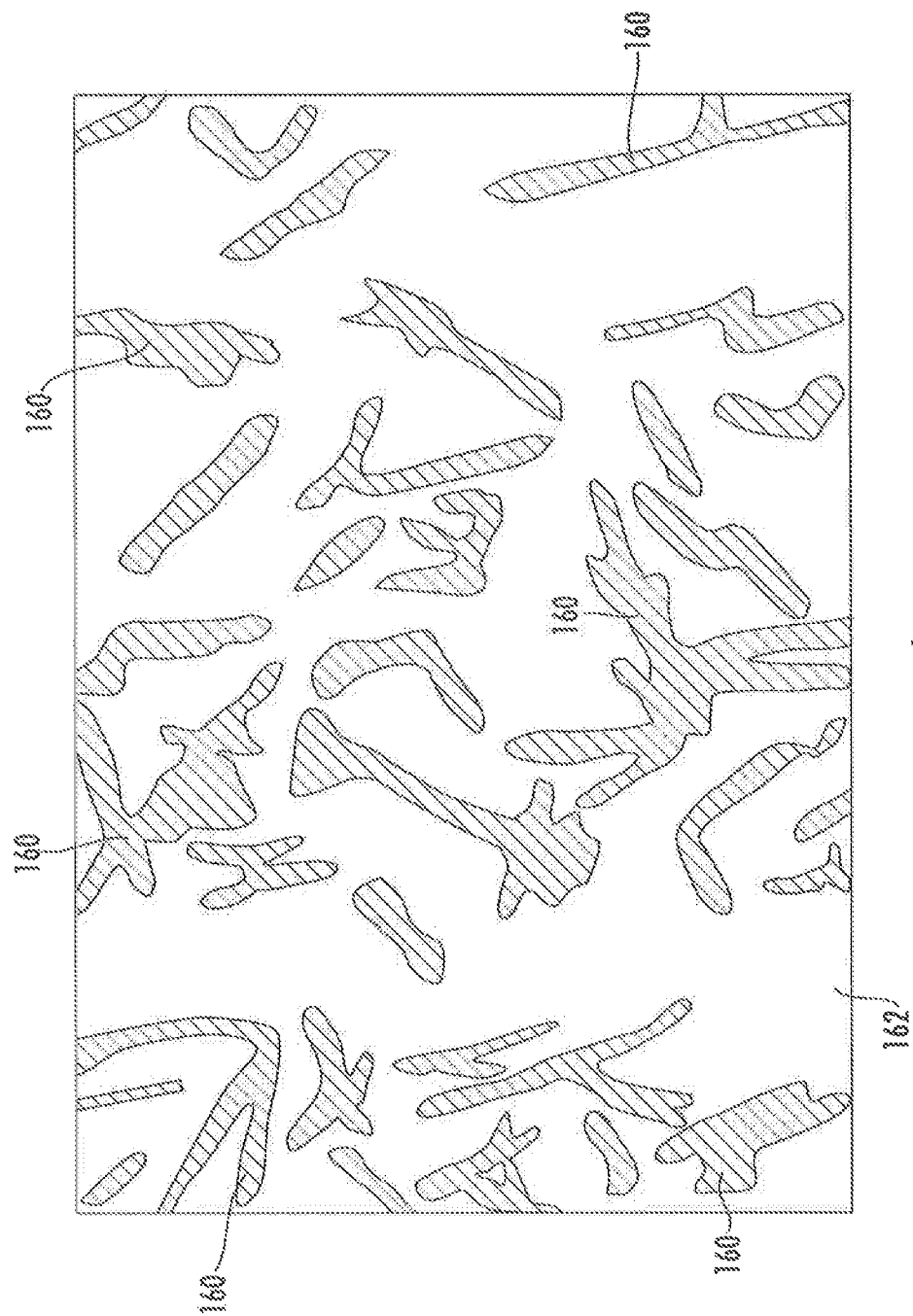
FIG. 4 illustrates an example, simplified view of an image of a field acquired using an imaging device(s) of the disclosed system, particularly illustrating how the image may be analyzed using one embodiment of a vision-based residue-estimating technique in accordance with aspects of the present subject matter.

Referring now to FIG. 4, an example, simplified image of a portion of a field that may be provided by one of the imaging device(s) 104 of the disclosed system 100 is illustrated in accordance with aspects of the present subject matter, particularly illustrating the field including crop residue 160 (indicated by cross-hatching) positioned on the top of the soil 162. As indicated above, the image analysis module 126 of the controller 102 may generally be configured to utilize any suitable computer-vision algorithms or image-processing techniques that allow the controller 102 to identify crop residue 160 remaining on top of the soil 162. For instance, in one embodiment, the vision-based technique used by the image analysis module 126 may rely upon the identification of one or more image characteristics captured by the imaging device(s) 104 to distinguish the crop residue 160 from the soil 162 contained within each image. For instance, when the imaging device(s) 104 corresponds to a camera capable of capturing the distinction between the reflective characteristics of the soil 162 and the crop residue 160, the controller 102 may be configured to implement a computer-vision algorithm that identifies the differences in the reflectivity or spectral absorption between the soil 162 and the crop residue 160 contained within each image being analyzed. Alternatively, the controller 102 may be configured to utilize an edge-finding algorithm to identify or distinguish the crop residue 160 from the soil 162 contained within each image.

Additionally, upon distinguishing the crop residue 160 from the soil 162, the controller 102 may be configured to utilize any suitable technique or methodology for calculating the percent crop residue coverage for the portion of the field contained within each image. For instance, as indicated above, the controller 102 may, in one embodiment, utilize a "blob analysis" in which the crop residue identified within each image via the associated computer-vision technique is represented as a "blob" or plurality of "blobs" encompassing a given area within the image. Specifically, as shown in FIG. 4, the crop residue 160 depicted within the image is represented as cross-hatched blobs overlaying the soil 162. In such an embodiment, the image analysis module 126 may be configured to calculate the percent crop residue coverage for the imaged portion of the field using the following equation (Equation 1):

$$\text{Percent Crop Residue} = \left(1 - \frac{(\text{total image area} - \text{blob area})}{\text{total image area}}\right) * 100 \quad (1)$$

wherein, the total image area corresponds to the total area defined within the image (e.g., as a function of the total number of pixels of the image) and the blob area corresponds to the total area represented by crop residue 160 within the image (e.g., as a function of the total number of pixels representing the identified crop residue).

Figure 5:
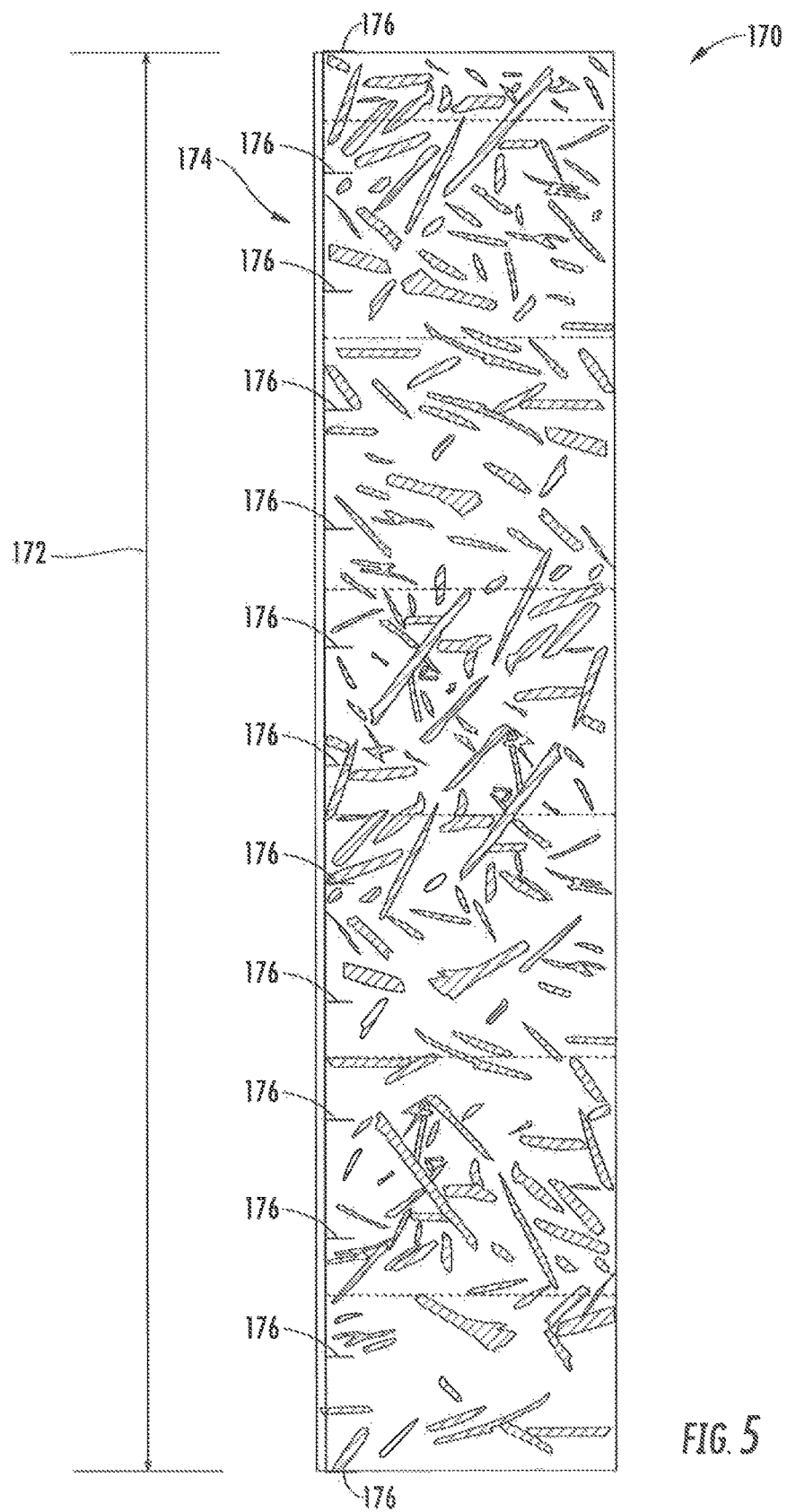
FIG. 5 illustrates an example, simplified view of a continuous imaged section of a field acquired using an imaging device(s) of the disclosed system, particularly illustrating how the images associated with the continuous imaged section of the field may be analyzed using another embodiment of a vision-based residue-estimating technique in accordance with aspects of the present subject matter.

Referring now to FIG. 5, an example, simplified view of a continuous section 170 of an imaged portion of a field is illustrated in accordance with aspects of the present subject matter. Specifically, FIG. 5 illustrates a plurality of images captured by one or more of the imaging device(s) 104 of the disclosed system 100 that collectively depict a continuous section 170 of the field. For instance, the field of view 106 of the imaging device(s) 104 may allow the imaging device(s) 104 to capture an image of the field that spans a given field distance. In such an embodiment, to analyze a continuous section 170 of an imaged portion of the field that extends across a predetermined field length 172 that is greater than the field distance captured within each image, multiple images may be stitched together or otherwise analyzed in combination. For instance, in the example view shown in FIG. 5, a plurality of images captured by one of the imaging device(s) 104 have been stitched together (e.g., the separate images being indicated by the dashed horizontal lines) to provide a view of a continuous section 170 of the field that spans across a predetermined field length 172.

It should be appreciated that the controller 102 (e.g., the image analysis module 126) may be configured to identify which images can be used to collectively depict a continuous section of the field using any suitable methodology or technique. For instance, as indicated above, the images provided by the imaging device(s) 104 may be time-stamped. In such an embodiment, by knowing the ground speed of the work vehicle/implement 10, 12 and the field of view 106 of the imaging device(s) 104 relative to the field, the controller 102 may be configured to stitch together or otherwise access the images captured by the imaging device(s) 104 that collectively depict a continuous field section 170 spanning across the predetermined field length 172. Alternatively, the controller 102 may be configured to utilize any suitable image-processing algorithm that allows the controller 102 to identify the images (or portions of images) that collectively depict a continuous section of the field.

By capturing images that collectively depict a continuous section 170 of the field, the image analysis module 126 of the controller 102 may, in several embodiments, be configured to implement a computer vision-based line transect method to estimate the percent crop residue coverage for the imaged portion of the field. Specifically, in several embodiments, the image analysis module 126 may access the images collectively depicting the continuous imaged section 170 of the field and apply a known scale 174 to such continuous imaged section 170 of the field such that a plurality of reference points 176 are defined along the continuous imaged field section 170 that are spaced apart evenly across the predetermined field length 172. Thereafter, the images may be analyzed to identify the number or percentage of reference points 176 that are aligned with or intersect crop residue within the continuous imaged section 170 of the field. Such identified number or percentage of the reference points 176 may then correspond to or may be used to calculate the percent crop residue coverage within the continuous imaged section 170 of the field. For example, in one embodiment, the percent crop residue coverage for the continuous imaged section 170 of the field may be calculated using the following equation (Equation 2):

$$\text{Percent Crop Residue} = \left(1 - \frac{\text{(identified reference points)}}{\text{total reference points}}\right) * 100 \quad (2)$$

wherein, the "identified reference points" correspond to the total number of reference points 176 identified by the image analysis module 126 that are aligned with or intersect crop residue with the analyzed images and the "total reference points" correspond to the total number of reference points 176 defined across the predetermined field length 172 via the applied scale 174.

In several embodiments, the scale 174 applied to the continuous imaged section 170 of the field may divide the predetermined field length 172 into one hundred distinct field sections such that one hundred reference points 176 are evenly spaced apart along the predetermined field length 170. In such an embodiment, it may be desirable for the continuous imaged section 170 of the field to correspond to a continuous field section spanning one hundred feet (i.e., such that the predetermined field length 172 is equal to one hundred feet). As a result, the imposed scale 174 may divide the predetermined field length 172 into one hundred one-foot sections, with a reference point 176 being defined at each foot mark along the predetermined field length 172. However, in other embodiments, the predetermined field length 172 may correspond to any other suitable field length, such as a fifty foot field section, a twenty-five foot field section or any other suitable field length. Similarly, any other suitable scale 174 may be applied to the continuous imaged section 170 of the field to allow any suitable number of evenly spaced reference points 176 to be defined across the predetermined field length 172. For instance, in alternative embodiments, a fifty-point scale or a twenty-five-point scale may be applied such that fifty or twenty-five evenly spaced reference points 176, respectively, are defined across the predetermined field length 172.

It should be appreciated that, in several embodiments, the image analysis module 126 may only be configured to identify the reference points 176 within the images that are aligned with or intersect crop residue that exceeds a given residue size threshold for purposes of calculating the percent crop residue coverage for the continuous imaged section 170 of the field. Specifically, in several embodiments, the size threshold for the crop residue may be selected based on the minimum residue size capable of intercepting rain drops. For instance, in one embodiment, the residue size threshold may correspond to a residue diameter of one-eighth of an inch (⅛"). In such an embodiment, if the crop residue aligned with or intersecting one of the reference points 176 is determined to have a cross-wise dimension within the image that exceeds ⅛" (e.g., via a suitable image analysis technique), such reference point 176 may be counted for purposes of calculating the percent crop residue coverage for the continuous imaged section 170 of the field. However, if the crop residue aligned with or intersecting one of the reference points 176 is determined to have a cross-wise dimension within the image that is less than ⅛", such reference point 176 may not be counted for purposes of calculating the percent crop residue coverage.

It should also be appreciated that, in several embodiments, the image analysis module 126 may be configured to perform the above-referenced analysis for multiple imaged sections of the field. For example, the image analysis module 126 may access images captured by the imaging device(s) 104 that collectively depict several different continuous imaged sections of the field, with each continuous imaged field section spanning a predetermined field length. Thereafter, for each continuous imaged section of the field, the image analysis module 126 may apply a known scale to such continuous imaged field section such that a plurality of reference points are defined along the continuous imaged field section that are spaced apart evenly across the predetermined field length. The images associated with each continuous imaged section of the field may then be analyzed to identify the number or percentage of reference points that are aligned with or intersect crop residue within such continuous imaged section of the field, thereby allowing a value for the percent crop residue coverage to be determined for each continuous imaged field section. In such an embodiment, the image analysis module 126 may then calculate an average percent crop residue coverage based on the residue coverage values calculated for the various continuous imaged field sections. In doing so, it may be desirable for the average percent crop residue coverage to be calculated based on the residue coverage values determined for at least five continuous imaged field sections, thereby allowing a desirable confidence level to be obtained for the calculated average.

Figure 6:
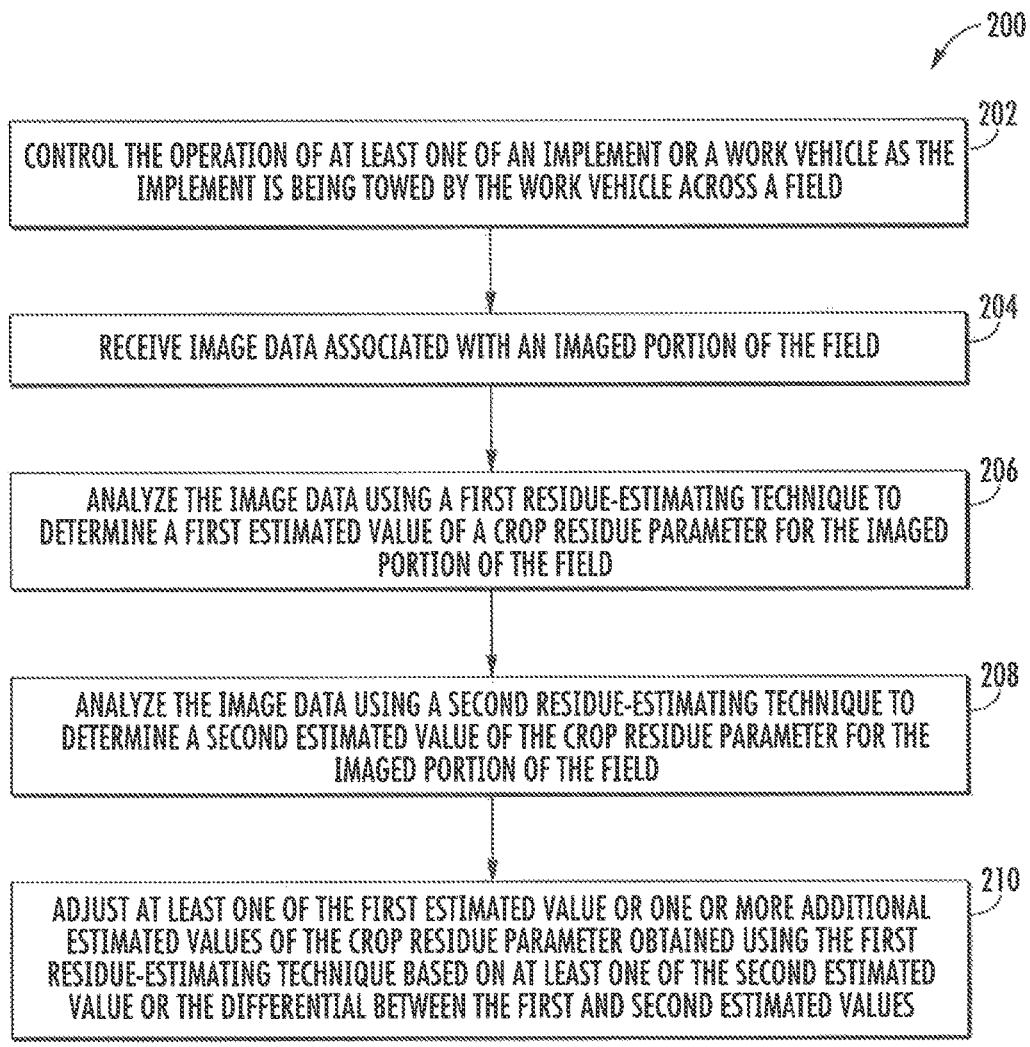
FIG. 6 illustrates a flow diagram of one embodiment of a method for calibrating crop residue data for a field acquired using a vision-based system in accordance with aspects of the present subject matter.

Referring now to FIG. 6, a flow diagram of one embodiment of a method 200 for calibrating crop residue data acquired using a vision-based system is illustrated in accordance with aspects of the present subject matter. In general, the method 200 will be described herein with reference to the work vehicle 10 and the implement 12 shown in FIGS. 1 and 2, as well as the various system components shown in FIG. 3. However, it should be appreciated that the disclosed method 200 may be implemented with work vehicles and/or implements having any other suitable configurations and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include controlling the operation of at least one of an implement or a work vehicle as the implement is being towed by the work vehicle across a field. Specifically, as indicated above, the controller 102 of the disclosed system 100 may be configured to control the operation of the work vehicle 10 and/or the implement 12, such as by controlling one or more components of the work vehicle 10 and/or the implement 12 to allow an operation to be performed within the field (e.g., a tillage operation).

Additionally, at (204), the method 200 may include receiving image data associated with an imaged portion of the field. Specifically, as indicated above, the controller 102 may be coupled to one or more imaging devices 104 configured to capture images of various portions of the field.

Moreover, at (206), the method 200 may include analyzing the image data using a first residue-estimating technique to determine a first estimated value of a crop residue parameter for the imaged portion of the field. For instance, as indicated above, the image analysis module 126 of the controller 102 may be configured to implement a vision-based residue-estimating technique to estimate a crop residue parameter for the imaged portion of the field, such as by estimating the percent crop residue coverage for the imaged portion of the field using a computer vision-based blob analysis or using a computer vision-based line transect method.

Referring still to FIG. 6, at (208), the method 200 may include analyzing the image data using a second residue-estimating technique to determine a second estimated value of the crop residue parameter for the imaged portion of the field. Specifically, as indicated above, the image analysis module 126 of the controller 102 may, in accordance with aspects of the present subject matter, be configured to implement two different vision-based residue-estimating techniques for estimating a given crop residue parameter for the imaged portion of the field. For instance, in an embodiment in which the first residue-estimating technique corresponds to a computer vision-based blob analysis, the second residue estimating technique may, for example, correspond to a computer vision-based line transect method or vice versa. As such, the controller 102 may determine two separate estimated values for the crop reside parameter using the two different residue-estimating techniques.

Additionally, at (210), the method 200 may include adjusting at least one of the first estimated value or one or more additional estimated values of the crop residue parameter obtained using the first residue-estimating technique based on at least one of the second estimated value or the differential between first and second estimated values. Specifically, as indicated above, when a differential exists between the first and second estimated values, the controller 102 may be configured to adjust the first estimated value determined using the first residue-estimated technique based on the second estimated value determined using the second residue-estimated technique and/or based on the differential existing between the first and second estimated values. For example, assuming that a percent crop residue coverage of 40% is determined using the first residue-estimating technique and a percent crop residue coverage of 32% is determined using the second residue-estimating technique, the controller 102 may, in one embodiment, the adjust the estimated percent crop residue coverage associated with the first residue-estimating technique to match the percent crop residue coverage associated with the second residue-estimating technique (e.g., by reducing the percent crop residue coverage from 40% to 32%). In addition, the controller 102 may also utilize the differential defined between the first and second estimated values to adjust any past or future estimated values determined using the first residue-estimating technique, such as by applying a −8% modifier to each estimated value determined using the first residue-estimating technique.

It should be appreciated that, although not shown, the method 200 may also include any additional steps or method elements consistent with the disclosure provided herein. For example, the method 200 may also include actively adjusting the operation of the implement 12 and/or the work vehicle 10 when the adjusted value for the first estimated value and/or the adjusted value(s) for the one or more additional estimated values determined using the first residue-estimating technique differs from a target value set for crop residue parameter. Specifically, as indicated above, when the estimated crop residue parameter differs from a target value set for such parameter, the controller 102 may be configured to actively adjust the operation of the work vehicle 10 and/or the implement 12 in a manner that increases or decreases the amount of crop residue remaining within the field following the operation being performed (e.g., a tillage operation), such as by adjusting the ground speed at which the implement 12 is being towed and/or by adjusting one or more operating parameters associated with the ground-engaging elements of the implement 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for calibrating crop residue data for a field acquired using a vision-based system, the method comprising:
controlling, with a computing device, an operation of at least one of an implement or a work vehicle as the implement is being towed by the work vehicle across the field;
receiving, with the computing device, image data associated with an imaged portion of the field from one or more imaging devices provided in operative association with at least one of the work vehicle or the implement;
analyzing, with the computing device, the image data using a first residue-estimating technique to determine a first estimated value of a crop residue parameter for the imaged portion of the field;
analyzing, with the computing device, the image data using a second residue-estimating technique to determine a second estimated value of the crop residue parameter for the imaged portion of the field, the second residue-estimating technique differing from the first residue-estimating technique; and
in response to determining that a differential exists between the first and second estimated values, adjusting, with the computing device, at least one of the first estimated value or one or more additional estimated values of the crop residue parameter determined using the first residue-estimating technique based on at least one of the second estimated value or the differential between the first and the second estimated values.

2. The method of claim 1, wherein the crop residue parameter corresponds to a percent crop residue coverage associated with the imaged portion of the field.

3. The method of claim 1, wherein analyzing the image data using the first residue-estimating technique comprises analyzing the image data using a computer vision-based image processing technique.

4. The method of claim 3, wherein the computer vision-based image processing technique corresponds to a vision-based blob analysis of the image data to determine the first estimated value of the crop residue parameter for the imaged portion of the field.

5. The method of claim 1, wherein analyzing the image data using the second residue-estimating technique comprises analyzing the image data using a computer vision-based line transect method.

6. The method of claim 5, wherein analyzing the image data using the computer vision-based line transect method comprises:
accessing a plurality of images of the image data that collectively depict a continuous imaged section of the field, the continuous imaged section extending across a predetermined length;
applying a known scale to the continuous imaged section of the field such that a plurality of reference points are associated with the continuous imaged section; and
determining a percentage of the plurality of reference points that are aligned with or intersect crop residue within the plurality of images.

7. The method of claim 6, further comprises determining the second estimated value of the crop residue parameter based at least in part on the percentage of the plurality of reference points that are aligned with or intersect crop residue within the plurality of images.

8. The method of claim 6, wherein determining the percentage of the plurality of reference points that are aligned with or intersect crop residue within the plurality of images comprises determining the percentage of the plurality of reference points that are aligned with or intersect crop residue that exceeds a given size threshold.

9. The method of claim 6, wherein applying the known scale to the continuous imaged section of the field comprises applying the known scale such that the plurality of reference points are spaced apart evenly across the predetermined length.

10. The method of claim 6, further comprising:
accessing a second plurality of images of the image data that collectively depict one or more additional continuous imaged sections of the field, each of the one or more additional continuous imaged sections of the field extending across the predetermined length;
applying the known scale to the one more additional continuous imaged sections of the field such that a plurality of reference points are associated with each of the one or more additional continuous imaged sections of the field;
determining a percentage of the plurality of reference points that are aligned with or intersect crop residue within the second plurality of images for each of the one or more additional continuous imaged sections of the field; and
determining the second estimated value of the crop residue parameter based on an average of the determined percentages associated with the continuous image section of the field and the one or more additional continuous imaged sections of the field.

11. The method of claim 1, further comprising actively adjusting the operation of at least one of the implement or the work vehicle when the adjusted value for the at least one of the first estimated value or the one or more additional estimated values differs from a target value set for the crop residue parameter.

12. A vision-based system for estimating and adjusting crop residue parameters as an implement is being towed across a field by a work vehicle, the system comprising:
an imaging device installed relative to one of the work vehicle or the implement such that the imaging device is configured to capture images of the field;
a controller communicatively coupled to the imaging device, the controller including a processor and associated memory, the memory storing instructions that, when implemented by the processor, configure the controller to:
receive, from the imaging device, image data associated with an imaged portion of the field;
analyze the image data using a first residue-estimating technique to determine a first estimated value of a crop residue parameter for the imaged portion of the field;
analyze the image data using a second residue-estimating technique to determine a second estimated value of the crop residue parameter for the imaged portion of the field, the second residue-estimating technique differing from the first residue-estimating technique; and
in response to determining that a differential exists between the first and second estimated values, adjust at least one of the first estimated value or one or more additional estimated values of the crop residue parameter determined using the first residue-estimating technique based on at least one of the second estimated value or the differential between the first and the second estimated values.

13. The system of claim 12, wherein the imaging device comprises a camera.

14. The system of claim 12, wherein the imaging device is installed relative to one of the work vehicle or the implement such that a field of view of the imaging device is directed either parallel or perpendicular to a travel direction of the work vehicle.

15. The system of claim 12, wherein the crop residue parameter corresponds to a percent crop residue coverage associated with the imaged portion of the field.

16. The system of claim 12, wherein the second residue-estimating technique corresponds to a computer vision-based line transect method.

17. The system of claim 16, wherein, when analyzing the image data using the computer vision-based line transect method, the controller is configured to:
 access a plurality of images of the image data that collectively depict a continuous imaged section of the field, the continuous imaged section extending across a predetermined length;
 apply a known scale to the continuous imaged section of the field such that a plurality of reference points are associated with the continuous imaged section; and
 determine a percentage of the plurality of reference points that are aligned with or intersect crop residue within the plurality of images.

18. The system of claim 17, wherein the controller is configured to determine the second estimated value of the crop residue parameter based at least in part on the percentage of the plurality of reference points that are aligned with or intersect crop residue within the plurality of images.

19. The system of claim 12, wherein the controller is further configured to actively adjust the operation of at least one of the implement or the work vehicle when the adjusted value for the at least one of the first estimated value or the one or more additional estimated values differs from a target value set for the crop residue parameter.

* * * * *